(12) United States Patent
Foreman et al.

(10) Patent No.: US 11,926,719 B2
(45) Date of Patent: Mar. 12, 2024

(54) MATERIALS COMPRISING SHAPE MEMORY ALLOY WIRES AND METHODS OF MAKING THESE MATERIALS

(71) Applicant: QinetiQ Limited, Hampshire (GB)

(72) Inventors: Andrew David Foreman, Aldershot (GB); Charlotte Bree Meeks, Farnborough (GB); Robert West, Farnborough (GB)

(73) Assignee: QINETIQ LIMITED, Hampshire (GB)

( * ) Notice: Subject to any disclaimer, the term of this patent is extended or adjusted under 35 U.S.C. 154(b) by 208 days.

(21) Appl. No.: 16/623,321

(22) PCT Filed: Jun. 26, 2018

(86) PCT No.: PCT/EP2018/067121
§ 371 (c)(1),
(2) Date: Dec. 16, 2019

(87) PCT Pub. No.: WO2019/002299
PCT Pub. Date: Jan. 3, 2019

(65) Prior Publication Data
US 2021/0139657 A1 May 13, 2021

(30) Foreign Application Priority Data

Jun. 28, 2017 (GB) .................................. 1710287

(51) Int. Cl.
*C08J 5/04* (2006.01)
*B29C 70/20* (2006.01)
(Continued)

(52) U.S. Cl.
CPC .............. *C08J 5/042* (2013.01); *B29C 70/20* (2013.01); *B29C 70/384* (2013.01);
(Continued)

(58) Field of Classification Search
CPC ... Y10T 156/10; Y10T 442/152; D04H 3/115; C22C 14/00; C08L 63/00; C08J 5/042;
(Continued)

(56) References Cited

U.S. PATENT DOCUMENTS 5,614,305 A 3/1997 Paine et al.
2007/0202296 A1* 8/2007 Chandrasekaran ..... C22C 14/00
428/124

(Continued)

FOREIGN PATENT DOCUMENTS

CN 101044018 A 9/2007
CN 101913270 A 12/2010
(Continued)

OTHER PUBLICATIONS

International Search Report and Written Opinion for PCT Patent App. No. PCT/EP2018/067121 dated Sep. 20, 2018.
(Continued)

*Primary Examiner* — Camie S Thompson
(74) *Attorney, Agent, or Firm* — KENEALY VAIDYA LLP

(57) ABSTRACT

Some embodiments relate to non-woven composite materials, methods of making and uses thereof, including articles including the composite structures. More particularly, some embodiments relates to non-woven composite materials possessing desirable impact performance and penetration resistance.

39 Claims, 14 Drawing Sheets

(51) Int. Cl.
    *B29C 70/38*    (2006.01)
    *C08J 5/18*    (2006.01)
    *C08L 63/00*    (2006.01)
    *C22C 14/00*    (2006.01)

(52) U.S. Cl.
    CPC .............. *B29C 70/386* (2013.01); *C08J 5/18* (2013.01); *C08L 63/00* (2013.01); *C22C 14/00* (2013.01)

(58) Field of Classification Search
    CPC .............. B64C 1/40; B64C 2001/0072; B29L 2031/3082; B29D 99/0021; B29K 2995/0089; B29C 70/386; B29C 70/00; B29C 70/20; B29C 70/202; B29C 70/24; B29C 70/382; B29C 70/384; B29C 70/88; B32B 2260/046; B32B 2262/106; B32B 2262/0253; B32B 2262/0269; B32B 2262/101; B32B 2262/103; B32B 2262/14; B32B 5/024; B32B 5/08; B32B 5/28; B32B 5/026; B32B 2250/20; B32B 2255/02; B32B 2255/26; B32B 2605/18
    USPC ............ 428/292.1, 299.1, 301.1, 212, 297.1, 428/298.1; 156/307.1, 60
    See application file for complete search history.

(56) References Cited

U.S. PATENT DOCUMENTS

| | | |
|---|---|---|
| 2010/0133039 A1 | 6/2010 | Liguore |
| 2013/0074663 A1 | 3/2013 | Pedigo et al. |
| 2013/0122277 A1 | 5/2013 | Ellis et al. |
| 2015/0027631 A1* | 1/2015 | Liguore .................. B32B 5/28 156/307.1 |
| 2016/0288429 A1 | 10/2016 | Bergstrom et al. |
| 2018/0162073 A1 | 6/2018 | Fujiura et al. |
| 2021/0146576 A1* | 5/2021 | Foreman .................. B32B 5/06 |

FOREIGN PATENT DOCUMENTS

| | | |
|---|---|---|
| CN | 102933387 A | 2/2013 |
| CN | 103029309 A | 4/2013 |
| CN | 103398240 A | 11/2013 |
| CN | 106273551 A | 1/2017 |
| CN | 106393730 A | 2/2017 |
| EP | 2113649 A2 | 11/2009 |
| JP | H04-083713 U | 7/1992 |
| JP | H07-196824 A | 8/1995 |
| JP | 2003335876 A | 11/2003 |
| JP | 2013071846 A | 4/2013 |
| JP | 2016138285 A | 8/2016 |
| JP | 2017007342 A | 1/2017 |
| WO | WO02057527 A1 | 7/2002 |
| WO | WO2006/046008 A1 | 5/2006 |
| WO | WO2006046008 A1 | 5/2006 |
| WO | WO2008/147754 A1 | 12/2008 |
| WO | WO2012020109 A2 | 2/2012 |
| WO | WO2015-075190 A1 | 5/2015 |
| WO | WO2015075190 A1 | 5/2015 |
| WO | WO2016190194 A1 | 12/2016 |
| WO | WO2017099260 A1 | 6/2017 |

OTHER PUBLICATIONS

Search Report for GB Patent App. No. 1710287.2 dated Dec. 22, 2017.

Wang et al., "Fatigue behaviour of glass-fibre-reinforced epoxy composites embedded with shape memory alloy wires," Composite Structures 2017;178:311-319.

* cited by examiner

MATERIALS COMPRISING SHAPE MEMORY ALLOY WIRES AND METHODS OF MAKING THESE MATERIALS

CROSS REFERENCE TO RELATED APPLICATION(S)

This application is a national phase filing under 35 C.F.R. § 371 of and claims priority to PCT Patent Application No. PCT/EP2018/067121, filed on Jun. 26, 2018, which claims the priority benefit under 35 U.S.C. § 119 of British Patent Application No. 1710287.2, filed on Jun. 28, 2017, the contents of each of which are hereby incorporated in their entireties by reference.

BACKGROUND

Some embodiments relate to composite materials, methods of making and uses thereof, including articles including or formed from the composite materials. More particularly, some embodiments relate to non-woven composite materials possessing desirable impact properties, methods of making and uses thereof. Some embodiments also relate to prepreg materials and preform materials which are suitable for making the composite materials of some embodiments and methods of making thereof.

Fibre reinforced polymer (FRP) composites as a class of material are known and include a polymer matrix phase within which is embedded fibres, typically being of carbon, glass or aramid. Conventional FRP composites possess a relatively poor resistance to impact damage which, in the case of an aircraft structure, could be imparted in use e.g. by runway debris or bird strikes.

In order to enhance the impact resistance of FRP composite structures it is known to incorporate shape memory alloys (SMA) or superelastic alloys (which are a type of SMA) in fibre reinforced polymer composites. WO 2006/046008 (WO '008) describes fibre reinforced polymer composite structures incorporating a woven preform containing tows of carbon or other fibres and wires of shape memory alloy. The SMA wires are reported as being capable of absorbing much larger amounts of strain energy than the more conventional components of FRP composites and that they enhance the impact and penetration resistance of the structure.

In order to make the composite structures of WO '008, the SMA wires are woven together with at least some of the reinforcing fibres in one or more integral preforms.

Though the weaving process may result in a reduction of the in-plane strength of a composite material compared to composite materials made using unidirectional (non woven) plies, it is generally considered that the surprising and advantageous properties associated with the materials described in WO '008 may be ascribed, at least in part, to the woven nature of the material.

Surprisingly, the present inventors have found that broadly comparable, (at least), impact performance and penetration properties can be achieved without having to resort to using a woven structure.

SUMMARY

It is an object of some embodiments to provide an SMA reinforced composite material (which may also be referred to herein as an SMA/composite material) possessing at least comparable performance when compared with known woven composite materials, (for example as described in WO '008) particularly in connection with impact and penetration resistance, and possible that such materials should offer a number of routes which are suitable for commercial production. It is a further object of some embodiments to provide methods of making the composite material(s) and uses thereof.

According to a first aspect of some embodiments, there is provided a composite material including:
   a polymer matrix material with reinforcing fibres and shape memory alloy (SMA) wires embedded therein, wherein the SMA wires and reinforcing fibres are not woven together.

In the first aspect of some embodiments, the SMA wires and reinforcing fibres may alternatively or additionally be described as being unidirectional. As such, and in accordance with a further aspect of some embodiments, there is provided a composite material including:
   a polymer matrix material with reinforcing fibres and shape memory alloy (SMA) wires embedded therein, wherein the SMA wires and reinforcing fibres are unidirectional.

In the first and further aspects of some embodiments the composite material may consist of or can include a single ply. The composite material may include more than one ply. More than one ply may be referred to herein as multi-ply.

The polymer matrix may be formed from a resin, more particularly, the polymer matrix may be formed by curing a polymer resin. The polymer resin may also include a curing agent or hardener. The polymer resin may be at least partially polymerised prior to curing. Curing may typically cause the formation of cross links.

In a second aspect, there is provided a prepreg material suitable for forming the composite material in accordance with the first or further aspect of some embodiments including reinforcing fibres and SMA wires, wherein the SMA wires and reinforcing fibres are not woven together and wherein the fibres are impregnated and/or coated with polymer resin.

In the prepreg material or form, the reinforcing fibres and SMA wires may be coated and/or impregnated (in the case of the fibre) with a polymer resin which is not, or has not been, cured. The prepreg material may be taken to be a single layer (or single ply).

In a third aspect, there is provided a preform material suitable for forming the composite material in accordance with the first or further aspect of some embodiments including a layer of reinforcing fibres and SMA wires, wherein the SMA wires and reinforcing fibres are not woven together.

In the preform material, for each layer thereof, the non-woven SMA wires and reinforcing fibres may be held together by a thread, for example a light weight thread. The thread may consist of, or include, a polymer such as polyester. The preform material may be referred to herein as a non crimp fabric or a non crimp woven. The thread may hold the SMA wires and reinforcing fibres together by being woven into the structure, for example in a warp direction and possible only in a warp direction. Such an arrangement may be referred to as a non crimp woven. A non crimp fabric may include stitching the SMA wires together in a single plane or in a single layer, for example using a thread referred to above. The layer may be included in a stack of the layers to form the non crimp fabric which may be a multiaxial fabric, e.g. biaxial, triaxial or quadriaxial or greater than quadriaxial. A preform may be taken to mean, unless otherwise stated, that the SMA wires and reinforcing fibres are present in the absence of polymer resin, i.e. they are essentially in a "dry" form though polymer resin may be combined with the preform. As mentioned, the preform material may be included in a stack, i.e. a stack may include greater than one layer or ply of preform material and may be referred to as a preform material stack. Further, the stack may be referred to as a laminate stack. The preform material (single ply or multi-ply) may be combined with a polymer resin. For example, the preform may be infused with resin. Infusion may be achieved using resin transfer moulding (RTM) or any of the other known infusion techniques. The resin may be applied using moulding methods such as injection moulding.

In a fourth aspect of some embodiments, there is provided a tape including or consisting of a prepreg material in accordance with the second aspect of some embodiments.

The tape may possess a width of equal to or less than about 8 cm, for example less than about 6.5 cm, or less than about 5 cm or less than about 3 cm. The tape may be at least about 3 mm wide. The tape may possess or can include or consist of a single layer or ply of prepreg material. Typically, the tape may be formed or prepared on a substrate such as paper or polymer which is provided as backing. The substrate, e.g. paper or polymer, is removed prior to the tape being deposited on a surface or a mould.

In a fifth aspect of some embodiments, there is provided a method of making a composite material in accordance with the first (or further) aspect of some embodiments including forming a first layer of preform material in accordance with the third aspect of some embodiments, forming at least one further layer of preform material and depositing or layering the at least one further layer of preform material on the first layer of preform material to form a stacked preform material and applying polymer resin to the stacked preform material, curing the polymer resin to form the composite material.

The orientation of the layers of preform material relative to each other may be such so as to achieve the desired in-plane performance. The resin may be applied using moulding methods such as injection moulding, or infusion processes such as resin transfer moulding.

In a sixth aspect of some embodiments, there is provided a method of making a composite material in accordance with the first (or further) aspect of some embodiments including curing the prepreg material of the second aspect of some embodiments or the tape of the fourth aspect of some embodiments or the preform material of the third aspect of some embodiments after it has been combined with polymer resin.

The composite material and/or prepreg material in accordance with some embodiments are particularly suitable for use in tape or fibre laying processes. For example, the materials in accordance with some embodiments are particularly useful in automatic tape laying (ATL) and automatic fibre placement (AFP) techniques.

In a seventh aspect of some embodiments, there is provided a method of making a composite material in accordance with the first (or further) aspect of some embodiments including laying onto a substrate a tape in accordance with the fourth aspect of some embodiments and curing the tape. The tape may be laid or deposited using an automatic tape laying process.

In an eighth aspect of some embodiments, there is provided a method of making a composite material in accordance with the first aspect of some embodiments including laying or placing onto a substrate a prepreg material in accordance with the second aspect of some embodiments and curing the prepreg material. The prepreg may be laid or placed using an automatic fibre placement process.

The tape, or more generally the prepreg material, or the preform material, including in the form of a stack and combined with polymer resin, may be cured using standard techniques. These curing techniques are well known to the skilled person. For example, the prepreg material or the tape or the preform material, including in the form of a stack and combined with polymer resin, may be cured using UV light and/or heat to form the composite material. Curing may take place at room temperature. For ease of reference, the prepreg material and the preform material combined with polymer resin may be referred to herein as the pre-cured materials. The pre-cured materials may be exposed to UV light and/or heat for an appropriate time until curing is complete. Typically, the pre-cured materials may be exposed to heat and/or light of an appropriate wavelength at the same time that they are laid onto a substrate or shortly thereafter. Pressure may also be applied during curing. Pressure may be applied using a vacuum such as via the use of a vacuum bag. The polymer resin may include a catalyst and/or curing agent in order to assist with curing. For example, the curing agent may be, or include, an amine compound, for example an aromatic or aliphatic amine compound. The pre-cured materials or preform material may be used to form the composite material in accordance with some embodiments using a hand lay-up technique.

In a ninth aspect of some embodiments, there is provided an article formed from or including or consisting of a composite material in accordance with the first or further aspect of some embodiments. The article may be selected from a part of a vehicle, such as an aircraft, including a wing or a part of a wing, for example a leading edge of a wing or a wing panel. The article may form part of an aero engine, for example be included in a nacelle. The article may also be a fuel tank or part of a fuel tank or fuel tank access cover.

The tape in accordance with the fourth aspect of some embodiments may be made by splitting a multi-ply prepreg material or a single ply prepreg material wherein the multi-ply prepreg material includes greater than one layer. Hence, in a tenth aspect of some embodiments, there is provided a method of making a tape including or consisting of a prepreg material, the prepreg material including reinforcing fibres and SMA wires, wherein the SMA wires and reinforcing fibres are not woven together and the reinforcing fibres and SMA wires are coated (and/or in the case of the fibres, impregnated) with a polymer resin which is not cured, including splitting apart the multi-ply prepreg material to provide a single layer of prepreg material. The single layer of material may possess a width of less than or equal to about 8 cm and optionally be at least about 3 mm wide.

In an eleventh aspect of some embodiments, there is a provided a head component for use in an AFP device suitable for forming the composite material in accordance with some embodiments, wherein the head component includes a number of channels each of which are adapted to receive at least one fibre, the at least one fibre coated and/or impregnated with polymer resin, and at least one SMA wire which may be coated with polymer resin, wherein the channels are adapted to align the at least one fibre and at least one SMA wire so that the at least one SMA wire is positioned or arranged laterally to the at least one fibre and the fibre and associated SMA wire are unidirectional.

In the various aspects and embodiments of some embodiments, the wire may be of any type which offers the stress-strain characteristics of a shape memory alloy system. More particularly, such alloys may be formulated such that the capacity of the wires to absorb strain energy at the operating temperature or range of operating temperature of the respective material is maximised. The alloys may be formulated such that the capacity of the wires to absorb strain energy at the operating temperature or range of the operating temperature of the respective material may be due to either of the known hysteretic responses of martensitic twinning (shape memory effect) or martensitic transformation (superelasticity) or a combination of the two. Advantageously, the alloy may be mainly or solely in the martensitic twinning form. The currently preferred alloy is of the Ti—Ni type (nitinol) although other candidates may include ternary alloys Ti—Ni—Cu, Ti—Ni—Nb or Ti—Ni—Hf, copper-based SMAs such as Cu—Zn—Al, Cu—Al—Ni, Cu—Al—Zn—Mn, Cu—Al—Ni—Mn or Cu—Al—Mn—Ni or iron-based SMAs such as Fe—Mn—Si, Fe—Cr—Ni—Mn—Si—Co, Fe—Ni—Mn, Fe—Ni—C or Fe—Ni—Co—Ti. The alloy may be suitably heat treated to obtain the desired response. The volume fraction of the SMA wires in the material may typically be in the range of about 2-40 vol %, about 2-25 vol %, or about 12 vol % to about 40 vol % or more particularly about 3-12 vol %.

The fibrous reinforcement in a material according to some embodiments may be of any of the (non-SMA) types employed in FRP composites but is advantageously one of the group of advanced fibres (typically having a tensile modulus in excess of 50 GPa or more possibly in excess of 200 GPa). The reinforcing fibres may be selected from one or any combination of carbon (for example, graphite), glass, aramid (e.g. Kevlar®), high modulus polyethylene or boron fibres.

The matrix material in the composite material according to some embodiments may also be of any of the types employed in FRP composites, including both thermosetting and thermoplastic resins, although thermosets are currently preferred due to their lower processing temperatures which imply fewer constraints on the transformation temperature of the SMA which is incorporated. A suitable polymer matrix for use in some embodiments includes or consists of or consists essentially of epoxide (polyepoxide).

By incorporating the SMA wires and reinforcing fibres in a unidirectional and a non-woven arrangement in accordance with some embodiments a number of advantages accrue.

Firstly, the materials are more amenable to commercial production. For example, the composite materials may be provided in the form of a tape or bindered tow and automated methods for making the composite structure such as Automated Fibre Placement (AFP) and Automated Tape Placement (ATP) or Automated Tape Laying (ATL) are suitable. Being able to make the non woven or unidirectional materials of some embodiments using any one or more of AFP, ATP or ATL is particularly advantageous. Also, manufacturing routes which are capable of operating at high throughput such as non-crimp fabric pick and place may be used to prepare the materials in accordance with some embodiments.

The non-woven materials in accordance with some embodiments may be referred to herein as unidirectional materials. The term unidirectional as used herein indicates the reinforcing fibres and wires are parallel or substantially parallel and run in a single direction in a given ply or layer or the majority thereof run in a single direction in a given ply or layer, and that there is no or minimal or reduced out of plane displacement of the fibre and/or wires. However, the term "unidirectional" is well understood in the field of composite materials. There may be a small number of fibres or other material which run in a direction other than the single direction referred to. The main intention of these other fibres or secondary fibres (or other material) may be to hold the primary fibres in place, although the secondary fibres may also afford some structural integrity or properties for the composite material. By "out of plane" is meant the main plane of a given ply. Out of plane displacement may be measured. More particularly, out of plane displacement may be measured in relation to the tensile strength. If the wires are completely aligned then the tensile strength will be at its maximum or ultimate value.

Embodiments of any aspect of some embodiments may provide one of more of the following advantages:
good impact performance;
good penetration resistance;
multifunctional properties;
good flexural modulus;
good compressive strength.

The details, examples and possibilities provided in relation to any particular one or more of the stated aspects of some embodiments will be further described herein and apply equally to all aspects of some embodiments. Any combination of the embodiments, examples and preferences described herein in all possible variations thereof is encompassed by some embodiments unless otherwise indicated herein, or otherwise clearly contradicted by context.

BRIEF DESCRIPTION OF THE FIGURES

Aspects of some embodiments will now be described in more detail, with reference to the appended drawings showing embodiment(s) of some embodiments.

FIG. 10 also illustrates an AFP head component in accordance with some embodiments.

DETAILED DESCRIPTION

Figure 1A:
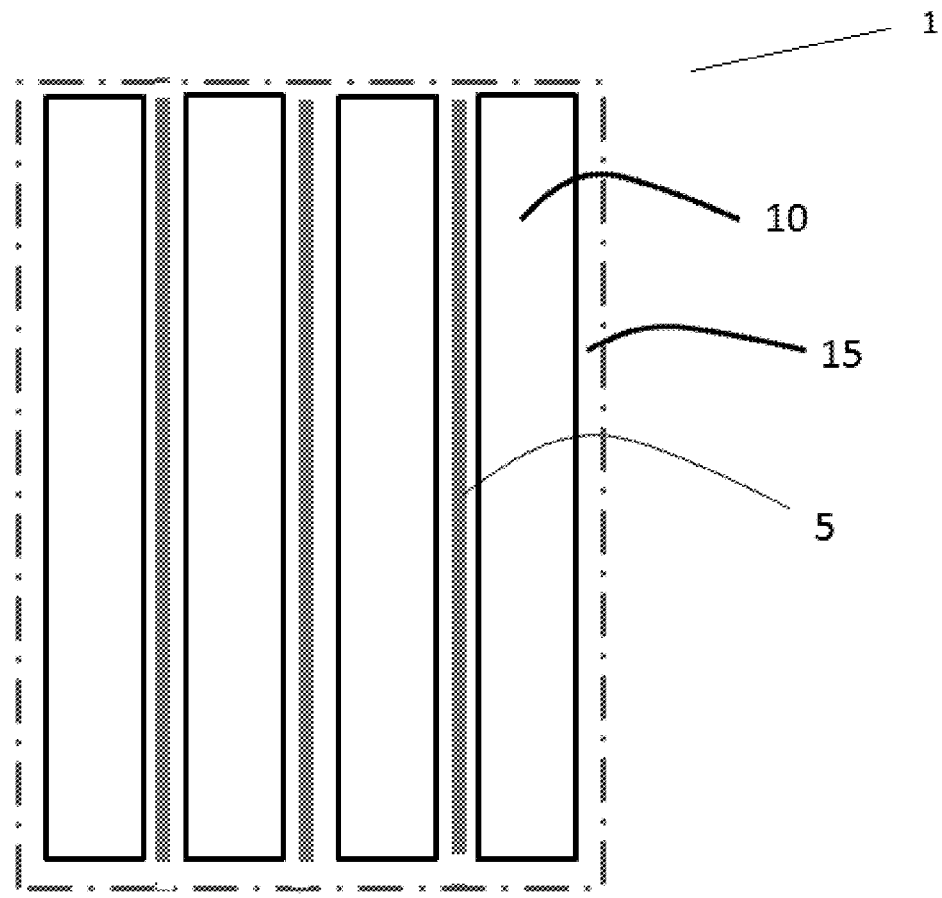
FIGS. 1a, 1b and 1c show cross sectional illustrations of embodiments of the composite material in accordance with some embodiments as single ply (plan and side views) and two ply (plan view) respectively.

Some embodiments will now be described with reference to the accompanying drawings, in which currently preferred embodiments of some embodiments are shown. Some embodiments may, however, be embodied in many different forms and should not be construed as limited to the embodiments set forth herein; rather, these embodiments are provided for thoroughness and completeness, and fully convey the scope of some embodiments to the skilled person. Like reference numerals in the drawings refer to like elements throughout.

Reinforcing Fibres

The reinforcing fibres may be any of the usual (non-SMA) types employed in fibre reinforced polymer (FRP) composites. In certain embodiments, the reinforcing fibres have a tensile modulus in excess of 50 GPa. In certain embodiments, the reinforcing fibres have a tensile modulus in excess of 200 GPa.

In certain embodiments, the reinforcing fibres may be selected from carbon fibres (CF), (including graphite), glass fibres, aramid fibres (e.g. Kevlar®), (high modulus) polyethylene fibres, boron fibres or a combination thereof. In certain embodiments, the reinforcing fibres are one of carbon fibres (including graphite), glass fibres, aramid fibres (e.g. Kevlar®), high modulus polyethylene fibres and boron fibres. In certain embodiments, the reinforcing fibres are carbon fibres. The reinforcing fibres may be selected from one or any combination of the listed fibres.

The reinforcing fibres may, for example, be carbon fibres having a diameter ranging from about 5 µm to about 10 µm, for example from about 6 µm to about 9 µm, for example from about 7 µm to about 8 µm. The reinforcing fibres may, for example, be present in tows (untwisted bundles of fibres). The tows may, for example, include from about 1000 to about 48,000 individual fibres. The dimensions and number of fibres mentioned herein is applicable to any of the fibres used in connection with some embodiments and is not limited to carbon.

SMA Wires

The wire may be of any type which offers the stress-strain characteristics of a shape memory alloy system. More particularly, such alloys may be formulated such that the capacity of the wires to absorb strain energy at the operating temperature or range of operating temperature of the respective material is maximised. The alloys may be formulated such that the capacity of the wires to absorb strain energy at the operating temperature or range of the operating temperature of the respective material may be due to either of the known hysteretic responses of martensitic twinning (shape memory effect) or martensitic transformation (superelasticity) or a combination of the two. Advantageously, the alloy may be mainly or solely in the martensitic twinning form. This may be when in operation and/or included in an article in accordance with some embodiments. The currently preferred alloy is of the Ti—Ni type (nitinol) although other candidates may include ternary alloys Ti—Ni—Cu, Ti—Ni—Nb or Ti—Ni—Hf, copper-based SMAs such as Cu—Zn—Al, Cu—Al—Ni, Cu—Al—Zn—Mn, Cu—Al—Ni—Mn or Cu—Al—Mn—Ni or iron-based SMAs such as Fe—Mn—Si, Fe—Cr—Ni—Mn—Si—Co, Fe—Ni—Mn, Fe—Ni—C or Fe—Ni—Co—Ti. The alloy may be suitably heat treated to obtain the desired response. The volume fraction of the SMA wires in the composite material may typically be in the range about 2-40 vol % or about 2-25 vol %, or about 12 vol % to about 40 vol %, or more particularly about 3-12 vol %. The SMA wires may be arranged to lie at the lateral edge of a reinforcing fibre tow. The wires are arranged so that they lie in the same plane as the reinforcing fibres, thus not contributing to any increase in, (or minimising), ply thickness in the main plane of any given ply.

The SMA wires may be of a composition and in a proportion to substantially enhance the impact resistance of the composite at a predetermined operating temperature or range thereof. The volume fraction of the SMA wires in the composite material may typically be in the range of about 2 vol % or about 12 vol % to about 40 vol %. The volume fraction of the SMA wires in the preform may, for example, be in the range of about 2 vol % to about 25 vol %.

Each SMA wire may, for example, have a diameter ranging from about 100 µm to about 300 µm. The SMA wire or wires may be of a circular cross-section.

In a variant of some embodiments, the SMA wires are not of circular cross-section but have an elliptical, oval, or otherwise "flattened" cross-section which is substantially longer in a first dimension than in a second dimension perpendicular to the first.

Where the SMA wire has an elliptical, oval or otherwise flattened cross-section, the SMA wire may have a major cross-sectional diameter ranging from about 200 µm to about 400 µm or from about 260 µm to about 340 µm or from about 270 µm to about 330 µm or from about 280 µm to about 320 µm. The SMA wire may, for example, have a minor cross-sectional diameter ranging from about 100 µm to about 250 µm or from about 260 µm to about 340 µm or from about 270 µm to about 330 µm or from about 280 µm to about 320 µm. Compared to circular wires of the same cross-sectional area this may achieve a reduction in the overall thickness of the preform material and associated prepreg material and composite material.

Similarly, for a given thickness, a single flat wire may have the same volume of SMA as a combination of two or more circular wires, but should be tougher due to the greater homogeneous volume. There may also be cost advantages as, per unit volume of SMA material, the single wire should be cheaper to produce.

The SMA wires will normally function in a purely passive sense, in that they are not intended to change shape in response to temperature change in use of the respective structure and no means are provided for deliberately applying an electrical voltage to the wires or otherwise initiating their thermal transformation.

The SMA wires will also not normally be prestrained within the non-woven preform material. However either of those measures may be employed. For example, it might be possible to temporarily repair a damaged structure or avoid catastrophic failure by reversing its deformation by heating.

Polymer Matrix

The matrix material in a composite material, (and resin in a prepreg material or preform material) according to some embodiments may be of any of the usual types employed in FRP composites. For example, the matrix material (or precursor or prepolymer thereof) may be a thermosetting resin or a thermoplastic resin, although thermosets are currently preferred due to their lower processing temperatures which imply fewer constraints on the transformation temperature of the SMA which is incorporated.

In certain embodiments, the polymer matrix is (or formed from) an epoxy (resin), an acrylic (resin), a polyester, a polyvinyl ester, a polyurethane, a phenolic (resin), an amino (resin) or a furan (resin). In certain embodiments, the polymer matrix is (or formed from) an epoxy (resin). The final cured version of the epoxy resin may be referred to as a polyepoxide. In embodiments of some embodiments, the polymer may consist of or consist essentially of or include any one of the listed polymers. The polymer matrix may consist of or consist essentially of or include any combination of the listed polymers.

The polymer resin may be cured using standard techniques for curing the polymers. For example, the resin may be cured using any one or combination of heat and UV radiation. The resin may be cured for an appropriate time until curing is complete.

Curing may include the use of an autoclave curing method or an out of autoclave curing method. For example, curing may include the use of autoclave ramp and curing temperatures and conditions. These temperatures and conditions may be consistent with the manufacturing method defined by the manufacturer of a resin system. Typically, a resin manufacturer will provide a datasheet which includes details of a suitable cure cycle. By way of example, the curing conditions for a commercially available prepreg material are provided below and relate to the use of an epoxy resin and unidirectional or woven fibres of carbon fibre or glass fibre and is cured in the presence of an amine curing agent. These conditions are suitable for use in some embodiments in preparing a prepreg material, e.g. a prepreg non-crimp woven.

Example curing conditions:
1. Apply full vacuum (1 bar).
2. Apply 7 bar gauge autoclave pressure.
3. Reduce the vacuum to a safety value of 0.2 bar when the autoclave pressure reaches approximately 1 bar gauge.
4. Heat at 1-3° C./min (2-8° F./min) to 110° C.±5° C. (230° F.±9° F.)
5. Hold at 110° C.±5° C. (230° F.±9° F.) for 60 minutes±5 minutes.
6. Heat at 1-3° C./min (2-8° F./min) to 180° C.±5° C. (356° F.±9° F.)
7. Hold at 180° C.±5° C. (356° F.±9° F.) for 120 minutes±5 minutes.
8. Cool at 2-5° C. (4-9° F.) per minute
9. Vent autoclave pressure when the component reaches 60° C. (140° F.) or below.

Methods of Manufacture

Unidirectional Prepreg Material

The prepreg material in accordance with some embodiments may be made by drawing fibres, for example from a spool or spools and aligning the fibres so that all or substantially all of the fibre tows run parallel or substantially parallel to one another typically before resin is added. SMA wire or wires are positioned between the fibre tows and along the lateral edge of the fibre tows. Typically, one, two or three SMA wires may be positioned next to any given fibre tow. The resin may be added using a solvent based process or a hot melt process. In the hot melt process, there are typically two stages. The first stage of the process may include coating a thin film of the heated resin on to a substrate, e.g. a paper or polymer substrate. The substrate may be referred to as a backing. The fibres, SMA wires and resin (which may be present on the substrate) may be combined in a prepreg machine. On application of heat and pressure, the resin is impregnated into the fibre resulting in the formation of the prepreg which may be subsequently wound on a core, effectively for storage prior to being used for forming or coating an article. In forming or coating an article, the substrate or backing is removed and the prepreg positioned on the article in any desired number of layers and cured to form the composite material.

Tape may be considered as falling under the more general term of prepreg material in so far as tape is prepreg material possessing a certain range of dimensions, typically in connection with thickness and width. Tape is typically provided on a substrate or backing such as a polymer backing or a paper backing. The backing may be referred to herein as a substrate. The backing is removed prior to the tape being applied to an article and cured during or following application. Tape in accordance with some embodiments is generally taken to mean a prepreg material possessing a single ply and width in the range of about 3 mm to less than or equal to about 8 cm.

Figure 8:
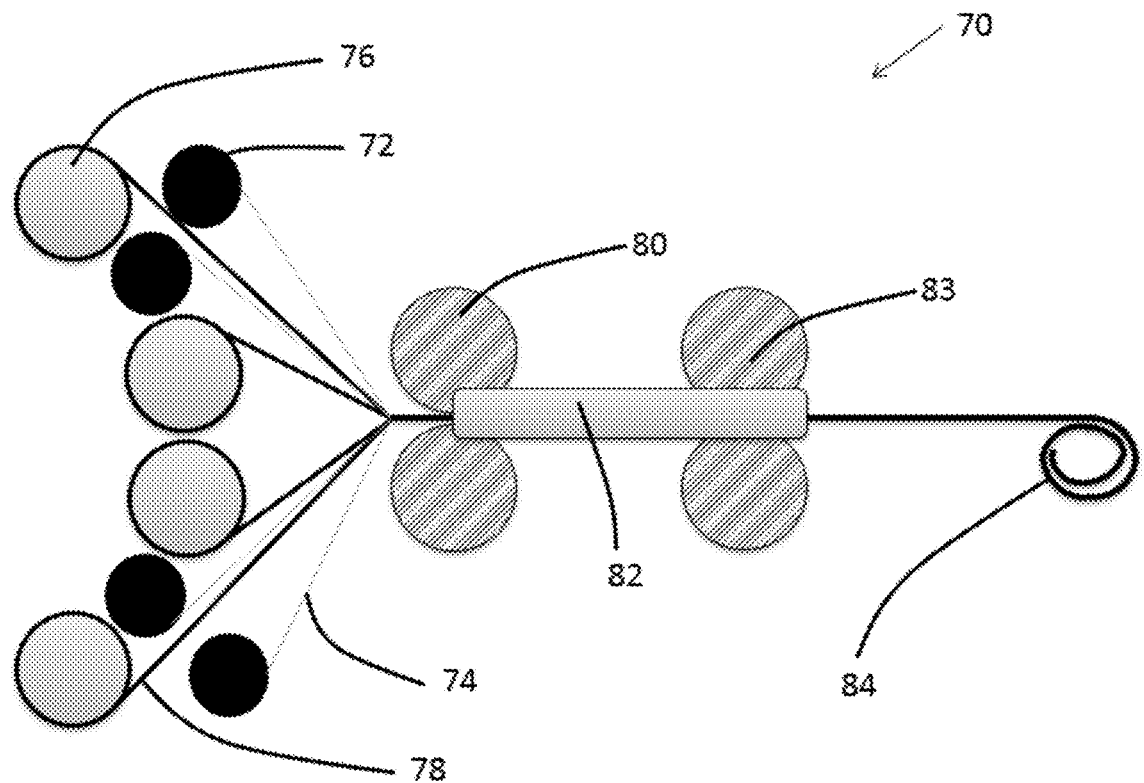
FIG. 8 is a diagrammatic of a line for fabricating tape including both reinforcing fibres and wires which is suitable for use in a tape laying technique for preparing the composite materials of some embodiments.
Figure 8A:
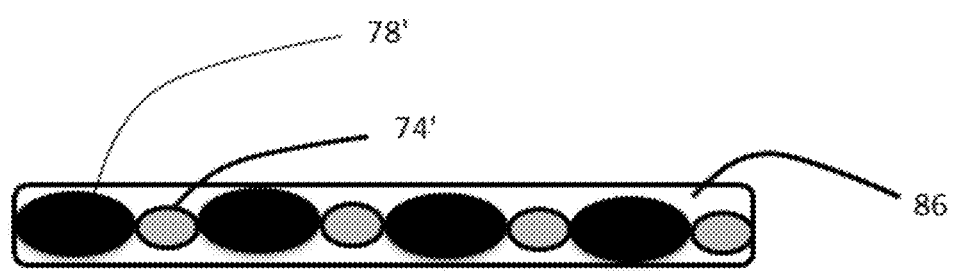
FIG. 8a is a cross-sectional drawing of a tape.

FIG. 8 illustrates a route or fabrication line for making tape in accordance with some embodiments indicated generally at (70). In FIG. 8, a number of spools or rolls (72) are shown which hold SMA wire (74) and a number of spools or rolls (76) are shown which hold fibre (78), for example carbon fibre. A single fibre may be referred to as a fibre tow. The fibres (78) and the SMA wires (74) are fed from the spools (72, 76) between a first set of rollers, indicated at (80) so that the fibres and wires are arranged in a unidirectional direction with the wires arranged laterally to the fibres and the arrangement is flat or essentially flat. Via the first set of rollers (80) a heated resin film on a substrate, such as paper, may be fed in so that the fibres and wires are in contact with the substrate and are coated with the resin. On application of heat and pressure, for example in a hot melt process, the resin is impregnated into the fibre. The hot melt process is indicated generally at (82). In the hot melt process, the first stage of the process typically includes coating a thin film of heated resin on to a substrate, e.g. a paper or polymer substrate. The fibres, SMA wires and resin are combined. On application of heat and pressure, the resin is impregnated into the fibre resulting in the formation of the prepreg material, i.e. tape if of appropriate dimension. The tape is typically of narrow width (for example, including from 1 to 10 tows or 1 to 8 or 1 to 4 tows and associated wires.) The tape is shown at (84) after passing through rollers (83) and includes a number of fibres (78') and SMA wires (74') and polymer resin (86). A cross-section of an example of a tape in accordance with some embodiments is shown in FIG. 8a, showing resin (86), wire (74') and fibre (78'). Alternatives to the hot melt process include the use of solvent baths and kiss-coating.

Dry Fibre Preform Material

Dry fibre preforms including at least one or greater than one ply may be made using a non crimped woven method or a non crimped fabric manufacturing method.

The composite materials in accordance with some embodiments may be made using what is referred to herein as a non crimped woven structure or a non crimped fabric and associated methods. The terminology "non crimped woven" is intended to indicate that though an element of weaving is introduced into the structure, the reinforcing fibres and SMA wires remain unwoven in that they retain their unidirectional nature, i.e. there is no, or minimal, change in the primary direction of the fibres and wires in an out of ply plane direction. The term unidirectional as used herein indicates the reinforcing fibres and wires are parallel or substantially parallel and run in a single direction (the fibres and wires may be referred to herein as primary fibres and wires), in a given ply or layer or the majority thereof run in a single direction in a given ply or layer, and that there is no (or minimal) out of plane displacement of the fibre and/or wires. There may be a small number of fibres or other material which may run in a direction other than the single direction, the main intention of these other fibres or secondary fibres may be to hold the primary fibres in place, although the secondary fibres may also afford some structural integrity or properties for the composite material. By "out of plane" is meant the main plane of a given ply. Out of plane displacement may be measured and, more specifically, may be measured in relation to the tensile strength. If the wires are completely aligned (and there is no, or minimal, crimping), then the tensile strength will be at its maximum or ultimate value.

The non-crimped woven or fabric structures may be made as follows. Layers or plies of non crimp woven which may be dry (or pre-impregnated with resin if the intention is to form a prepreg material) may be stacked to form a multi-ply structure. Each ply relative to the next ply immediately adjacent may be orientated to provide the desired in-plane structural properties. Once the required number of layers or plies is stacked, the material may be cured for those structures which are pre-impregnated or for those structures which are dry, impregnated with a resin system, for example using injection moulding.

The stitching thread (for non crimped fabrics) or warp weave (for non crimped wovens) may be introduced using a polymer, for example a thermoplastic polymer, e.g. a polyester. The stitching thread or warp weave may be a thermoplastic thread.

Automated Tape Placement (ATP) and Automated Tape Laying (ATL)

Automated tape laying (ATL) and automated tape placement (ATP) are processes that use computer guided robotics to lay one or several layers of prepreg material in the form of a tape onto a mold or substrate to create a structure or article or part thereof. The prepreg material is laid and then cured to form a polymer composite material.

Figure 9:
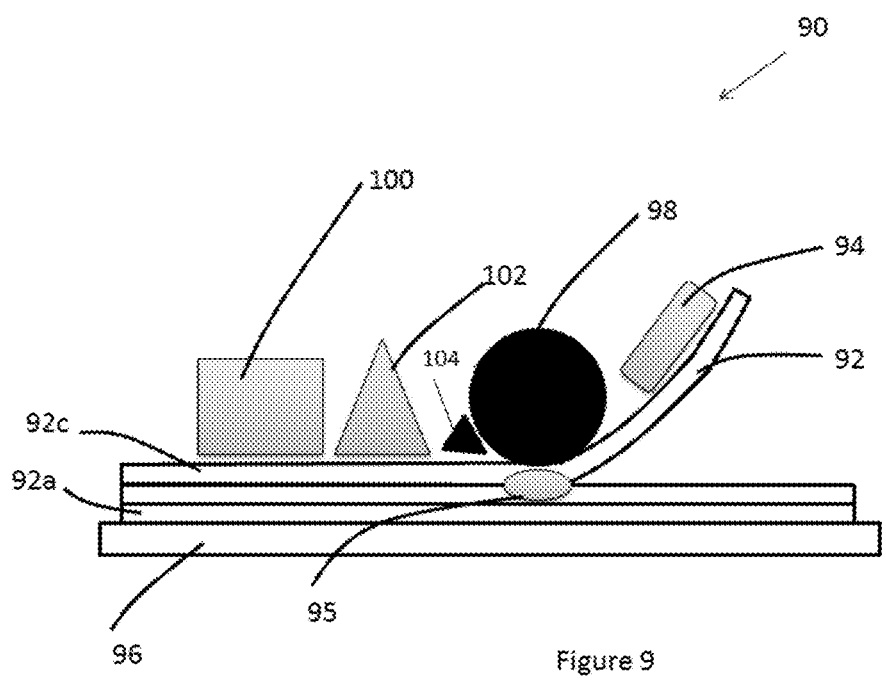
FIG. 9 is a diagram illustrating the formation of composite materials in accordance with some embodiments using Automated Tape Placement (ATP).

In a typical ATP or ATL technique, prepreg plies of material containing a mixture (or preform) of reinforcing fibres and SMA wires may be produced using a fabrication line, for example as described above and in connection with FIG. 8. SMA wire(s) may be fed from a roll or spool and aligned and combined into a single layer, ply or lamina, along with reinforcing fibres which may be supplied from a separate spool or roll. Alignment of the SMA wires and reinforcing fibres may be such that they form alternating rows of SMA wires and reinforcing fibres that are then combined with a flexible film of resin supplied from a further spool or roll. The single layer of fibres and wires may be pressed onto a resin film, for example, by further rollers and subsequently passed over a heating element which heats the resin film to its free-flowing temperature. Consolidation rollers may be used to impregnate the melted resin film onto the arrangement of fibres and wires in order to form a prepreg tape that may be taken up on to a spool. The prepreg tape may then be applied to an article and cured. FIG. 9 illustrates in simplified form the laying of a tape in accordance with some embodiments. In FIG. 9, the tape laying process is indicated generally at (90). A tape (92) formed in accordance with some embodiments is fed from a feed drum and heat is applied (94). The tape (92) is applied to a substrate (96). In the figure, the tape is shown as a series of single ply layers, with the first layer being deposited indicated at (92a) and the final or most recent one at (92c). During laying of the tape, focused heat energy (95) may be directed at the tape in order to cure at the moment or shortly after the tape is laid. The tape is pressed onto the substrate (96) using a consolidation roller (98). Inline (non-destructive) testing of the laid down tape may optionally be undertaken. This may include the use of, for example, X-ray and/or C-scan which are indicated at (100) and (102) respectively. In the tape laying process, the direction of tape laying may need to proceed in different directions and to facilitate this it may be necessary to cut the tape at intervals. Feature (104) in FIG. 9 indicates the presence of a tape cutter.

Automated Fibre Placement (AFP)

The composite materials in accordance with some embodiments may be made using an automated fibre placement (AFP) technique.

Figure 10:
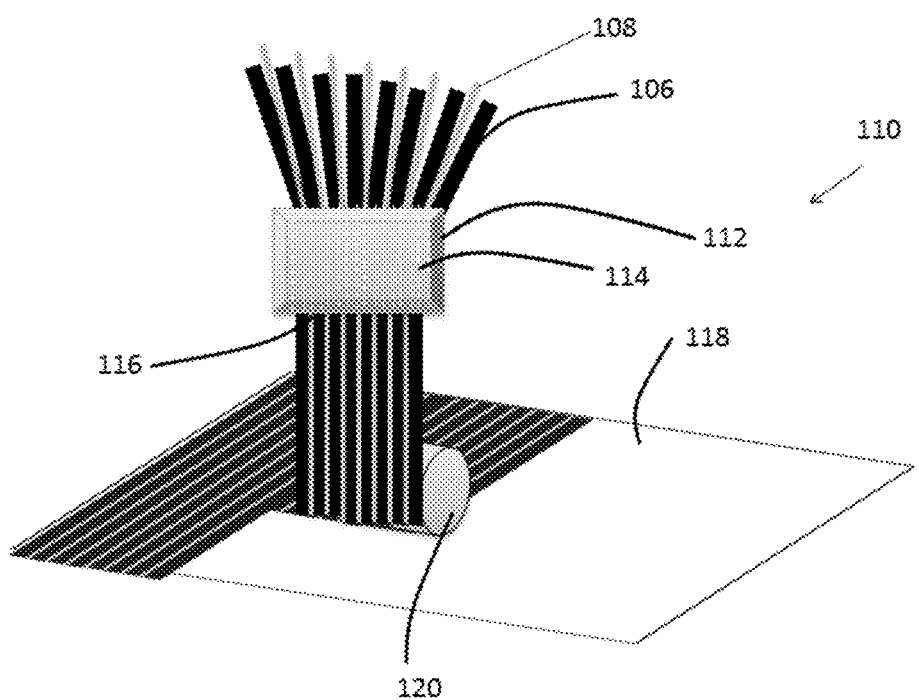
FIG. 10 is a diagram illustrating the formation of composite materials in accordance with some embodiments using Automated Fibre Placement (AFP).

FIG. 10 illustrates an AFP apparatus referred to generally at (110) and technique in accordance with some embodiments. In FIG. 10, an automated fibre head placement device is shown generally at (110), including an AFP head component (112) which itself includes a number of channels (114) into which may be fed a number of fibres (106) and SMA wires (108). The fibres are pre-coated or pre-impregnated in polymer resin and along with the wires are fed through the head indicated at (112) which aligns the fibres and wires so that they exit (116) in a unidirectional arrangement. The material (116) exiting the section of the head (112) is tacky or essentially in the form of a prepreg material and is placed on a mould or mould tool (118). In the embodiment shown, this is achieved using a roller (120). The AFP head (112) aligns the SMA wires and fibres so that the SMA wires are positioned on or at the lateral edge of the fibre (e.g. carbon) tow. The gap between the tows and the wires may be as low as possible. At the time of laying or placement of the prepreg material, or shortly thereafter, the prepreg material is cured, e.g. by heat and/or UV. Alternatively, the preform can be infused using a resin infusion method such as injection moulding. Though not shown, the AFP apparatus may further include a cutting blade suitable for cutting SMA wires and mounted spools for the SMA wire which regulate the rate and amount of wire which is fed in to the AFP head component.

Uses and Articles of Manufacture

There is also provided herein the use of the composite materials according to any aspect or embodiment disclosed herein to make an article of manufacture. There is also provided herein articles of manufacture made from or including the composite materials and/or preforms and/or prepregs disclosed herein.

In certain embodiments, the article of manufacture is a part for a vehicle. In certain embodiments, the article of manufacture is a part for an aircraft. In certain embodiments, the article of manufacture is a leading edge, for example a leading edge of an aircraft wing. In certain embodiments, the article of manufacture is a fuel tank access cover. In certain embodiments, the article of manufacture is a nacelle.

FIG. 1a shows a cross sectional illustration of an embodiment of the composite material in accordance with some embodiments. In FIG. 1a, the composite material in accordance with some embodiments is indicated generally at (1). The composite material includes reinforcing fibres (10) and shape memory alloy in the form of wires (5). The wire(s) (5) are at the lateral edge(s) of the reinforcing fibre(s) (10). In the embodiment shown, each wire may be the to be associated with a particular reinforcing fibre. The number of wires associated with a particular reinforcing fibre may be 1 or 2 or 3 and the number may vary from tow to tow. In a given composite structure, the number of wires associated with any given reinforcing fibre may be 1 or 2 or 3. The reinforcing fibres (10) and wires (5) are embedded in a polymer matrix (15). FIG. 1a is a plan view of a single ply. The reinforcing fibres (10) and shape memory alloy in the form of wires (5) are shown running in a single (uni) direction. This is further illustrated in FIG. 1b which is a side view of the composite material shown in FIG. 1a. For ease of reference, the reinforcing fibre (10) and SMA wire (5) are shown in the absence of polymer.

Figure 1B:
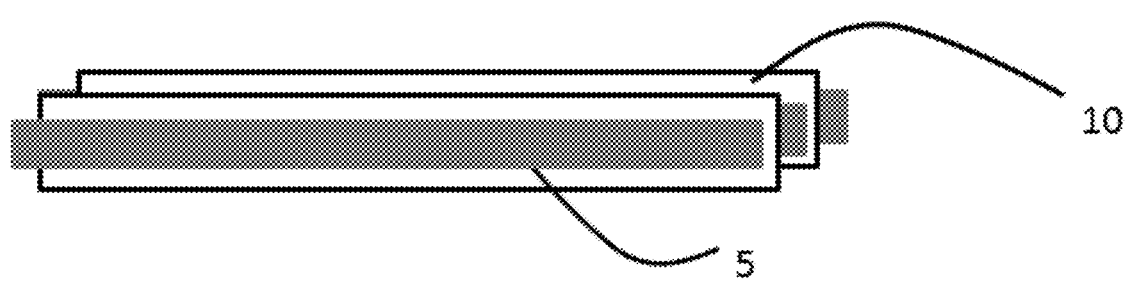
Figure 1C:
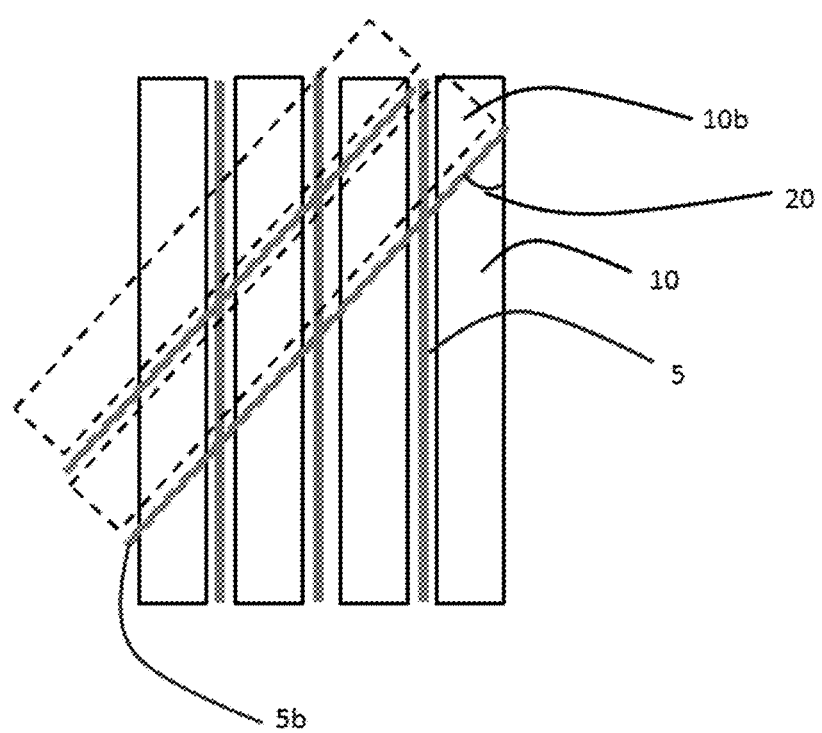

FIG. 1c shows a cross sectional illustration of an embodiment of the composite material in accordance with some embodiments including two plies. For clarity, the polymer matrix, indicated at (15) in FIG. 1 is not shown. The second ply or layer, positioned underneath the first ply and shown in dotted lines (partly), includes reinforcing fibres (10b) and shape memory alloy in the form of wires (5b). The reinforcing fibres (10b) and wires (5b) are also embedded in the polymer matrix (15). The angle the second layer or ply makes with respect to the first ply is indicated at (20). The composite material may be made of many plies and the angle (20) may vary from layer to layer or between two adjacent layers (or plys) within a composite material. When there is variance in direction between two adjacent layers, the angle indicated at (20) may range from >0° up to about 179°, and be any value in between i.e. any value which is greater than 0° and up to and including about 179° (or less than 180°). The angle indicated at (20) may be 0° when comparing any two adjacent or non adjacent layers.

In FIGS. 1a, 1b and 1c, the fibres and wires in a given layer (or ply) are not woven with fibres or wires in a different layer (or ply).

Figure 2A:
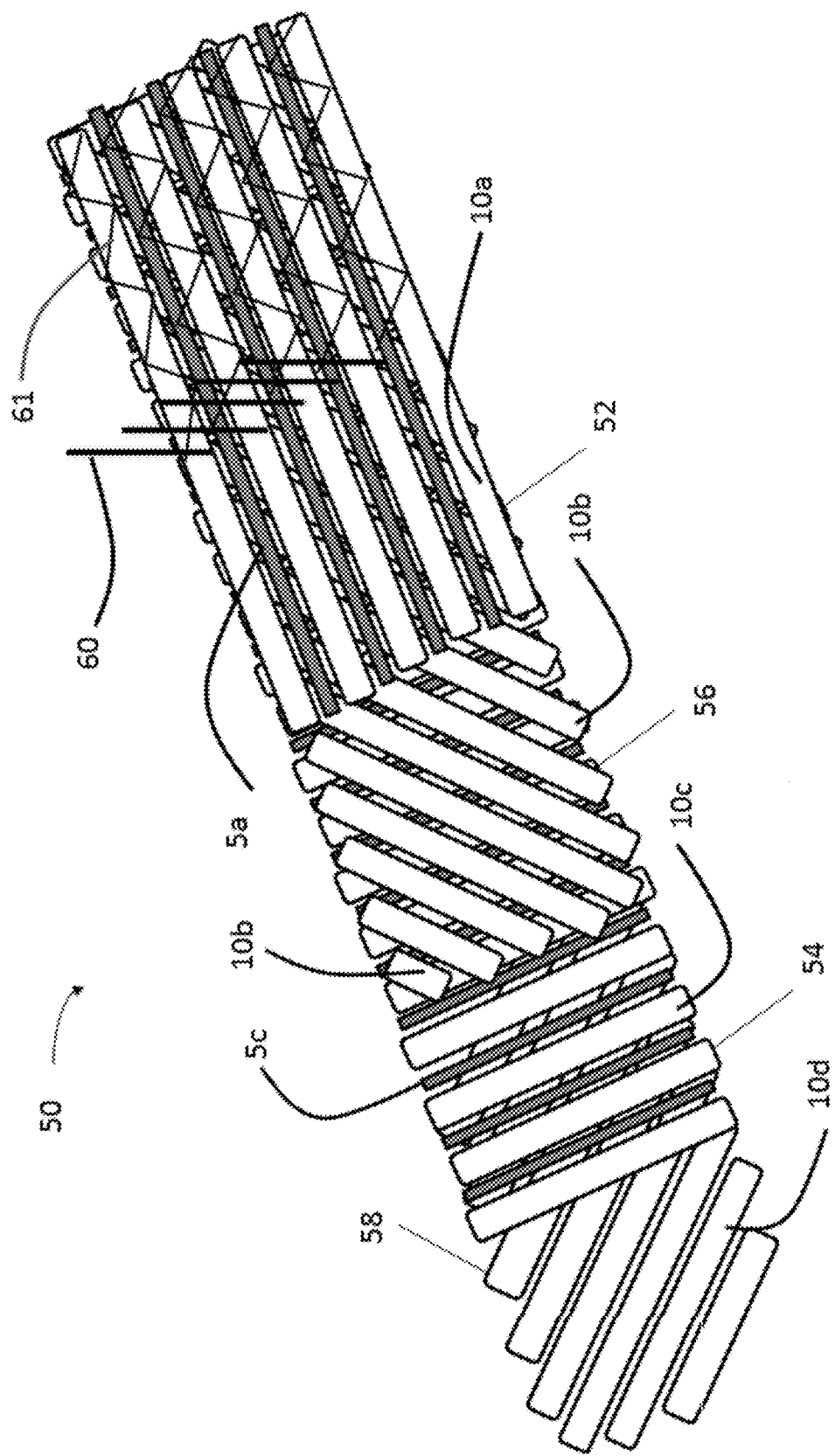
FIG. 2a shows a preform material in accordance with the third aspect of some embodiments in the form of a non crimp fabric possessing four layers and thus showing an example of a quadriaxial fabric.

FIG. 2a shows a preform material in accordance with the third aspect of some embodiments in the form of a non crimp fabric possessing four layers and showing an example of a quadriaxial fabric. In FIG. 2a, the preform in accordance with some embodiments is indicated generally at 50. The pre-form shown includes four layers or plies indicated at 52, 54, 56 and 58. Two of the four layers in the embodiment shown include essentially the same arrangement of fibres and wires. In each of the layers 52 and 54 the wires are indicated at 5a and 5c respectively and the fibres indicated at 10a and 10c. The layers 52 and 54 are shown staggered in relation to one another and at an angle of 90°. Layers 56 and 58 include tows of fibres (10b, 10d). As a representative layer, reference may be made to layer or ply 52. The arrangement of wires and fibres is essentially that described in connection with FIG. 1a. FIG. 2a shows how the orientation of the unidirectional fibres and wires in a given layer may vary when compared to adjacent layer(s) or non-adjacent layers. In FIG. 2a, the SMA wires are shown positioned at the lateral edge of fibre tows. Non crimp fabric materials or multiaxial fabrics or preform materials more generally may consist of or include single ply uniaxial, two ply biaxial, three ply triaxial or four play quadriaxial arrangements. SMA wires may be incorporated in any of the layers positioned at the lateral edge(s) of the fibres. In FIG. 2a, wires are shown in two of the layers. Multiple layers or plies of non crimped fabric may be referred to as blankets which may be stacked and impregnated with resin which may then be cured to form the composite material. The stitching location is illustrated at (60) stitches hold together the layers with a thin yarn or thread (61). This is typically carried out on a machine which is based on a knitting process, such as those made by Liba, Malimo and Mayer. The stitching pattern and tension can be controlled and changed in order to vary the precision with which the fibres are laid down, particularly in maintaining the fibres parallel relative to each other or substantially parallel. These knitting machines include a frame which simultaneously draws in fibres for each axis/layer until the required layers have been assembled and then stitches them together.

Figure 2B:
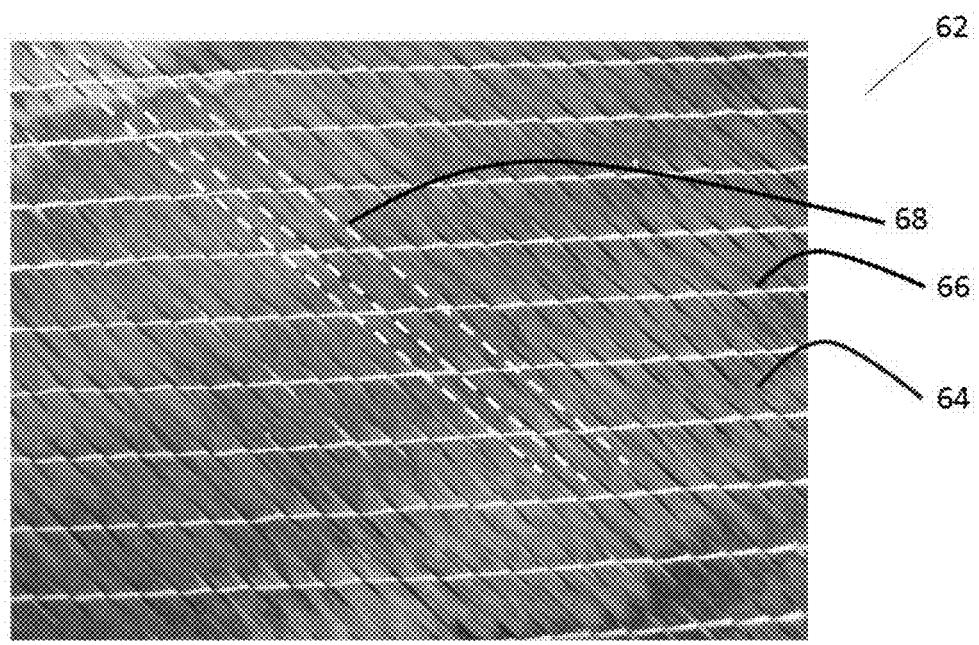
FIG. 2b shows an image of a preform material represented in a single layer of a non-crimp fabric and in accordance with the third aspect of some embodiments.

FIG. 2b shows a photograph of a non crimp fabric (62) in accordance with some embodiments. Fibres, stitching thread and location of wires are illustrated at (64), (66) and (68) respectively. The wires have been highlighted for ease of view.

EXAMPLES

The inventors investigated energy absorption of a non-woven composite in accordance with some embodiments and a woven structure for the purposes of comparison. For the non-woven structure, a non crimped woven (NCW) structure was prepared. The inventors also investigated the effect of varying the ratio of wire to fibre on impact performance and prepared samples using different methods of manufacture.

Example 1

A non-woven unidirectional composite material was prepared in accordance with some embodiments. Impact resistance measurements were made and compared with a woven composite material.

The non-woven material was prepared using a standard weaving loom with the reinforcement carbon fibres and SMA wires in the warp direction with an SMA wire placed at each lateral edge of each reinforcement carbon fibre. In the weft direction a fine polyester thread was used to stabilise the warp fibres. The SMA wires were made from a Nitinol alloy of nickel and titanium.

The woven material, present for the purposes of comparison, was made by using a standard industrial weaving machine. In the weft direction, carbon fibres and SMA wires placed at each lateral edge of each of the carbon reinforcement fibres are woven over and under the carbon fibres and SMA wires (positioned at each lateral edge of the carbon fibres) which are in the warp direction. The SMA wires were made from a Nitinol alloy of nickel and titanium.

The polymer matrix for both samples was formed from an epoxy resin which was cured using standard conditions to form the polymer matrix.

The placement of SMA in both non-woven and woven structures was equivalent.

Figure 3A:
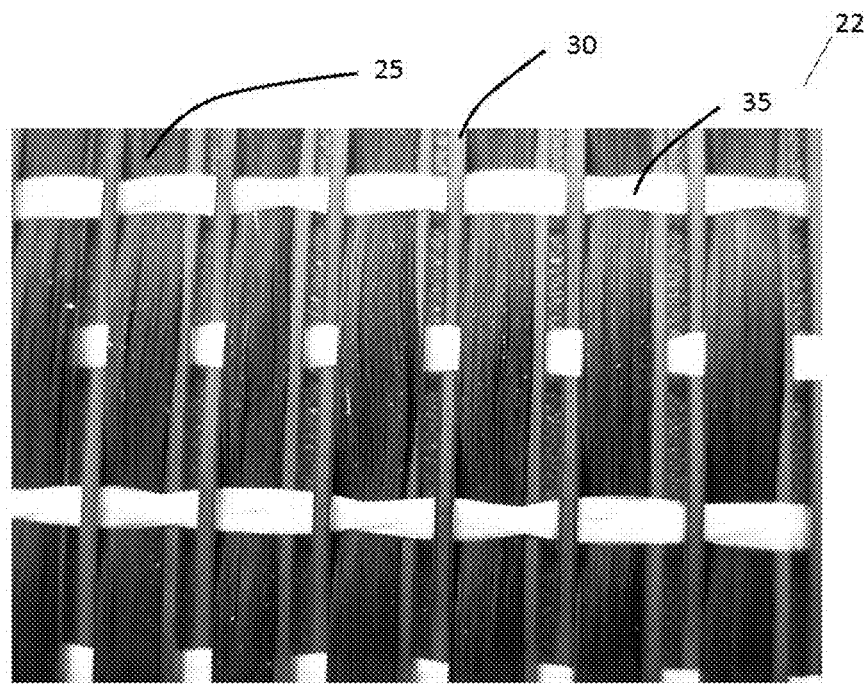
FIGS. 3a and 3b are photographs of a preform ply (layer) and composite material made in accordance with Example 1: (a) a non-woven unidirectional SMA and carbon fibre preform and; (b) a composite material made by stacking plies of (i) preimpregnated (i.e. prepreg) carbon fibre and (ii) prepreg carbon fibre and SMA wires, which are then cured.

FIG. 3a is a photograph of the non-woven unidirectional SMA and carbon fibre preform indicated generally at (22) which has been cut from a continuous length of fabric in the warp direction (or may be a resin impregnated prepreg). The preform includes a series of combination threads each including a flat tow of carbon fibre (25), an SMA wire (30) (or wires) placed at the lateral side of the carbon fibre (25). A thread, e.g. polymer thread (35), is woven into the preform to assist (temporarily) in holding the structure together before the preform is combined with a polymer resin (or polymer precursor) to form a prepreg which will ultimately form the polymer matrix (not shown) in the composite material following curing. The temporary (polymer) thread may be referred to herein as a "temporary polymer weave". Reference to the preform indicates that no polymer resin (other than in certain embodiments, the temporary polymer weave, shown by way of example at feature 35) is present. Prepreg indicates that the structure has been coated or impregnated with polymer resin but has not been cured. Following formation of the final polymer matrix, the temporary polymer weave is not evident in the final material, unless different materials are used for the temporary polymer weave and the final polymer matrix.

Figure 3B:
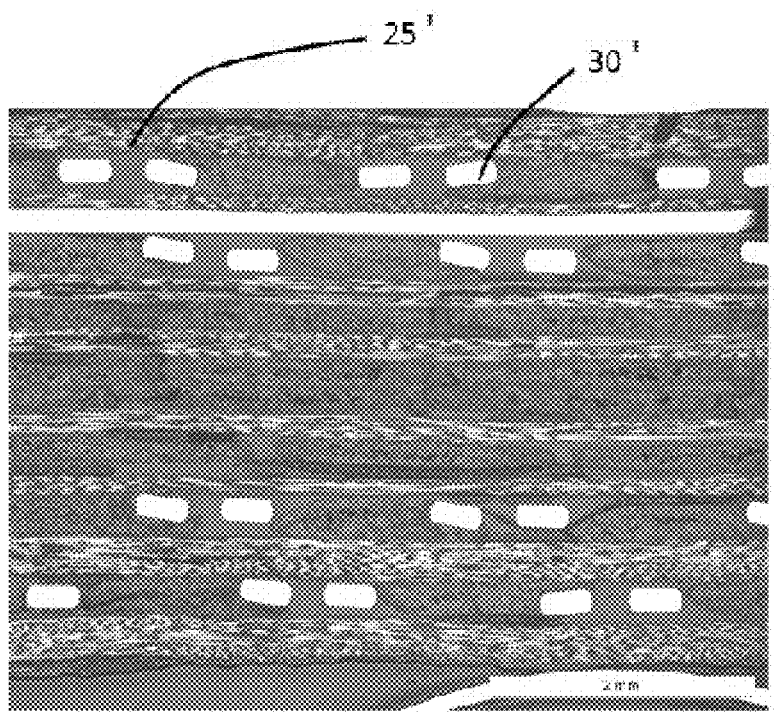

FIG. 3b is a prepreg laminate made from plies of (i) non crimp woven carbon fibres and (ii) non-crimp woven carbon fibres and SMA wires. The laminate is made from 16 non woven plies in the following orientation: 0 (C/SMA), 90 (C/SMA), 0 (C/SMA), 90 (C/SMA), 0 (C), 90 (C), 90 (C), 0 (C), 90 (C/SMA), 0 (C/SMA), 90 (C/SMA), 0 (C/SMA). The first layer is indicated as 0 (C/SMA) which indicates that the layer or ply includes carbon fibres and SMA wires. "0" indicates that this layer is labelled as being at an angle of 0°. The next layer which is labelled 90 (C/SMA) indicates that the ply or layer again includes carbon fibres and SMA wire and that the fibres and wire are arranged at an angle of 90° when compared to the previous layer relative to the plane in which the fibres and the wires lie. In a representative layer or ply the wires are indicated at 30' and the carbon fibre at 25'.

Energy absorption characteristics were measured via an instrumented drop weight impact test on top of 8 ply woven laminates (for comparison) and the 16 ply non-woven laminates as depicted in FIG. 3b.

Figure 4:
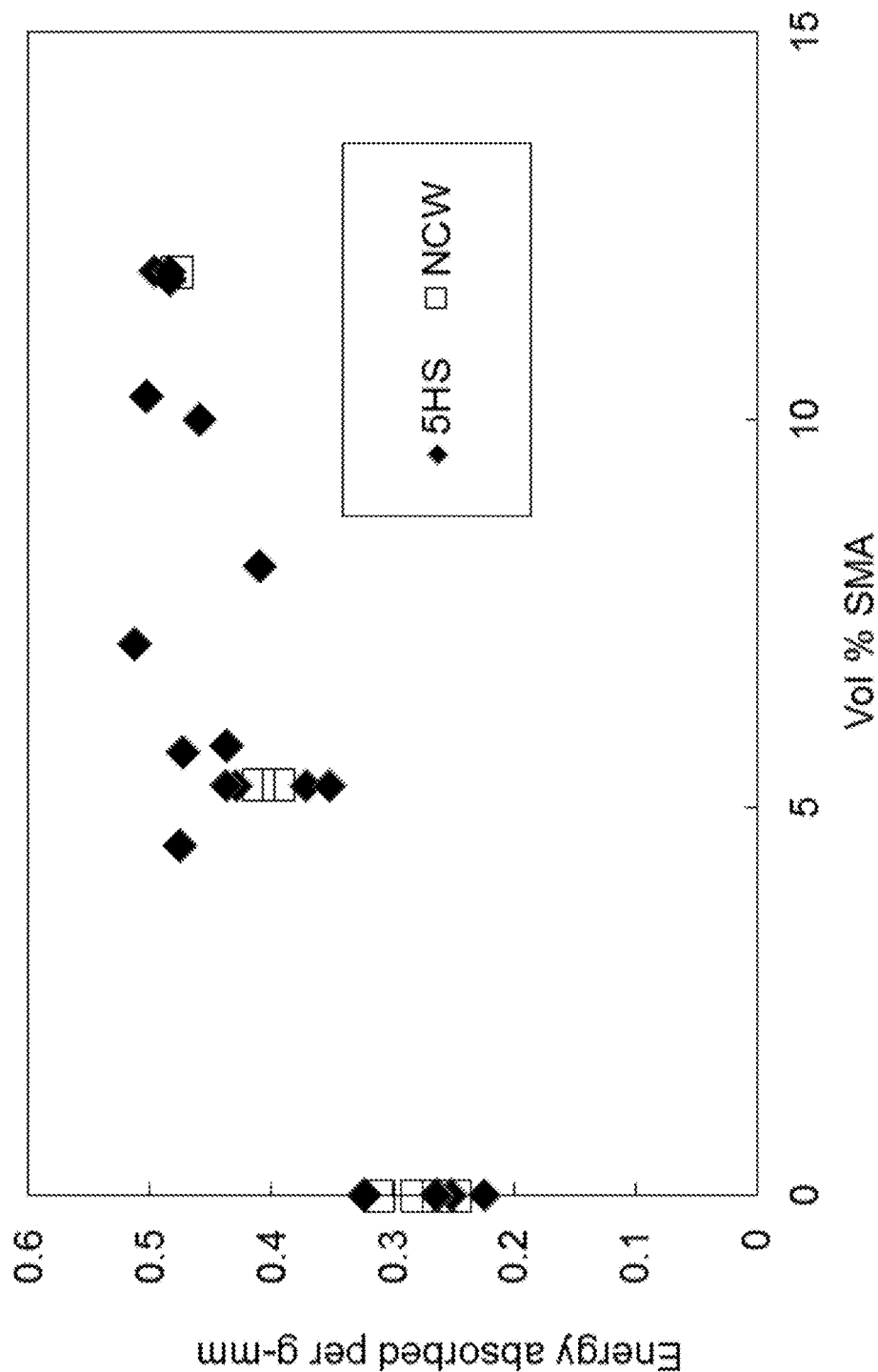
FIG. 4 is a plot of energy absorbed versus the volume of SMA vol % in connection with Example 1 and compares non-woven and woven samples. Examples of some embodiments are indicated by "NCW" which refers to "non crimped woven" and incorporates a polyester thread which is woven into the otherwise non-woven structure and 5HS refers to the woven structures present for the purposes of comparison.

The results of the tests are presented in FIG. 4 which shows a plot of energy absorbed per g-mm against the vol % of SMA present in the composite structure. The results indicate that at comparable loading of SMA wire, the non-woven and woven structures provided similar results. In FIG. 4, 5HS refers to the woven structures present for comparison and NCW refers to the samples in accordance with some embodiments.

Example 2

Samples were prepared so that comparison could be made between different non-woven structures in accordance with some embodiments and a non-woven structure including only carbon fibre and no SMA wires.

Samples were prepared in a similar manner to that described in connection with Example 1, using carbon fibre tows, Nitinol and epoxy resin.

Figure 5:
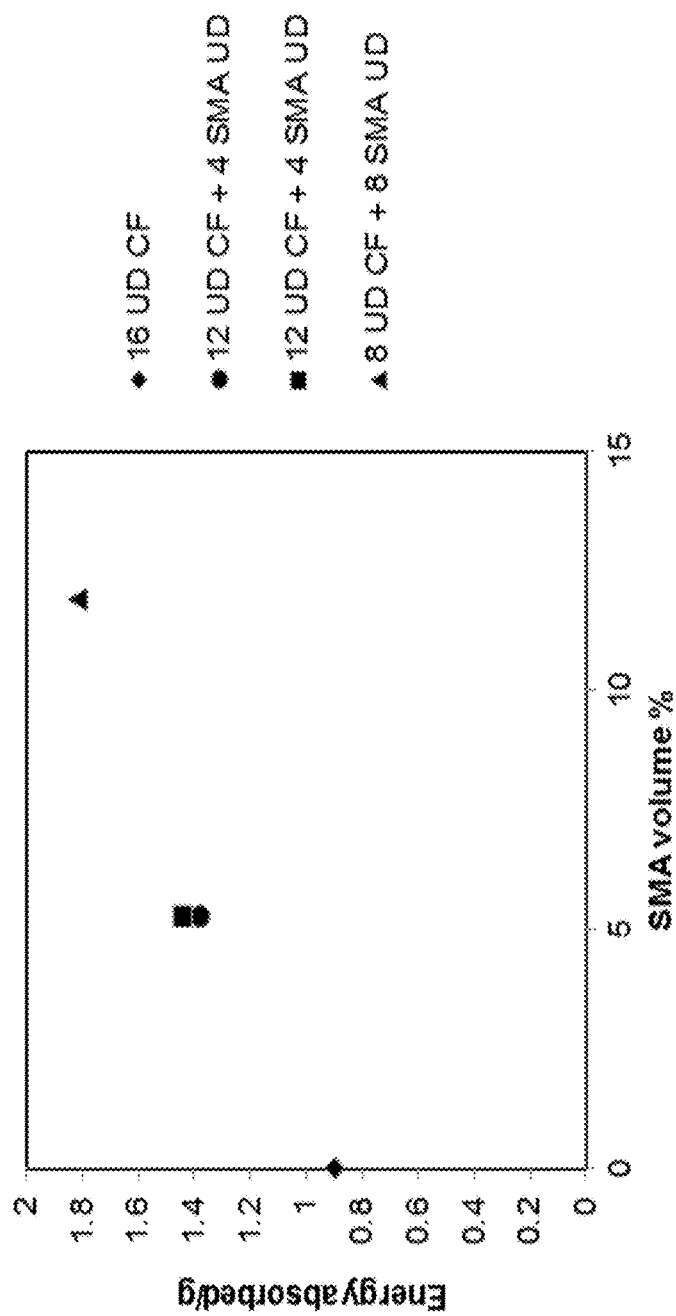
FIG. 5 is a plot of energy absorbed versus the volume of SMA vol % in connection with Example 2 and a series of non-woven samples in accordance with some embodiments and a unidirectional material not including any wires which is present for the purposes of comparison. "UD–16 CF" indicates the use of 16 unidirectional plies, each of which has carbon fibre present. The laminate of 16 plies are generated so that the orientation of each unidirectional ply is at 90° to the layer above and below. "UD–12 CF+4 SMA v1" and "UD–12 CF+4 SMA v2" indicates the use of 12 unidirectional plies each of which has carbon fibre present and 4 unidirectional plies each of which has two SMA wires and one carbon fibre tow wherein each carbon fibre has an SMA wire at each lateral edge. The laminate of 16 plies are generated so that the orientation of each unidirectional ply is at 90° to the layer above and below. "v1" and "v2" indicates a different lay-up orientation of the 16 plies in v1 and v2. UD-8 CF+8 SMA indicates the use of 8 unidirectional plies each of which has carbon fibre present and 8 unidirectional plies each of which has two SMA wires and one carbon fibre tow wherein each carbon fibre has an SMA wire at each lateral edge. The laminate of 16 plies are generated so that the orientation of each unidirectional ply is at 90° to the layer above and below.

The results are presented in FIG. 5. The results indicated that the best impact energy absorption was achieved using a composite structure including an equal number of carbon fibre tows and associated SMA wires and that a structure including carbon fibre and SMA wires performed significantly better than a comparable structure not including the wires.

Example 3

Non-woven materials were prepared using different production routes. The materials were made using a resin infusion process, more specifically a resin transfer moulding (RTM) technique. A prepreg material was also prepared.

The structures made in accordance with Example 2 including about 5 vol % SMA (Nitinol) were prepared by stacking layers of dry non crimp woven (carbon fibres) and non crimp woven (carbon fibres and SMA wires) as described in connection with Example 1. The plies were stacked in a mould tool and resin (epoxy) was infused through the tool to produce the laminate using an RTM technique.

Figure 6:
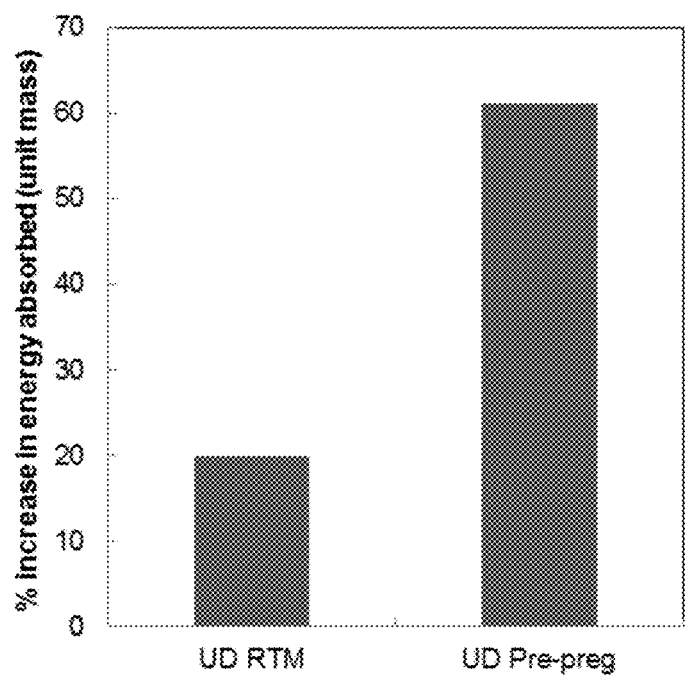
FIGS. 6, 6a and 6b show results and photographs obtained in connection with Example 3.

FIG. 6 illustrates the percentage increase in energy absorption with 5 vol % SMA in both prepreg and resin transfer molded (RTM) forms. The prepreg version possessed SMA wire reinforcement in both 0 and 90 direction and performed more effectively. The RTM panel possessed wires in only the 0 direction.

Figure 6A:
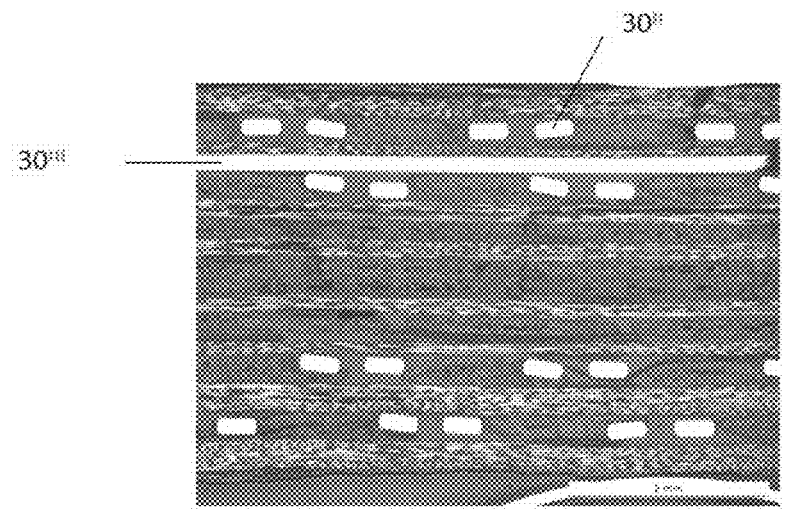
Figure 6B:
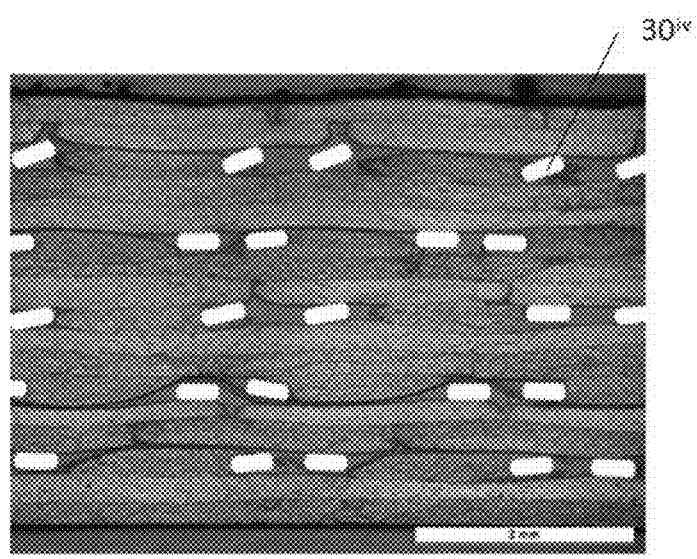

The prepreg panel (or stack) and RTM panel are illustrated in FIGS. 6a and 6b which show the SMA in 90°, (30") and 0°, (30") direction in the prepreg panel and SMA in the 0°(30") direction only in the RTM panel.

Example 4 (Scarf Repair)

Samples of non-woven and woven structures were prepared including 12 vol % of SMA (Nitinol). The non-woven structure was in the form of non crimped woven prepreg panel. The polymer resin used was epoxy resin.

Energy absorption tests were carried out at the centre of the panels on the site of the repair. The test showed that although the SMA wires were not continuous across the panel, the impact penetration resistance of the baseline structure could be regained using a standard composite scarf repair method.

Figure 7:
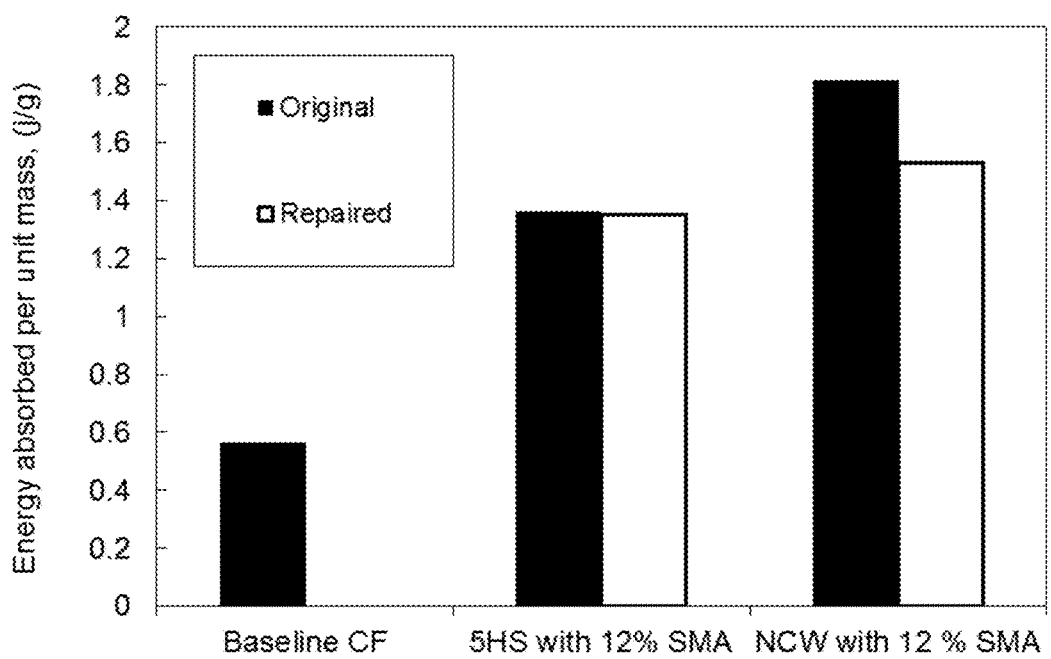
FIGS. 7, 7a and 7b show results and photographs obtained in connection with Example 4 (scarf repair) and relate to energy absorption with 12 vol % SMA in woven (for the purposes of comparison) and non woven samples (in accordance with some embodiments) in the form of NCW prepreg panels.

FIG. 7 shows that at least comparable results were provided by the non-woven structure when compared with the woven structure.

Figure 7A:
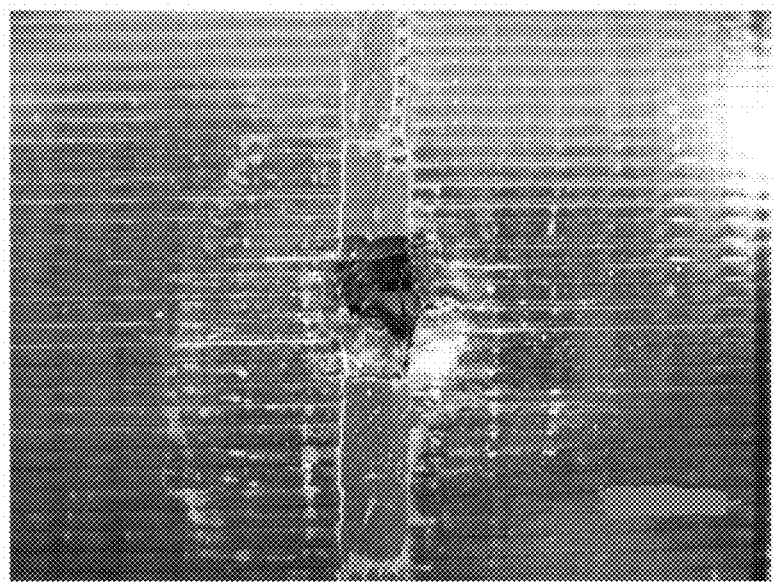
Figure 7B:
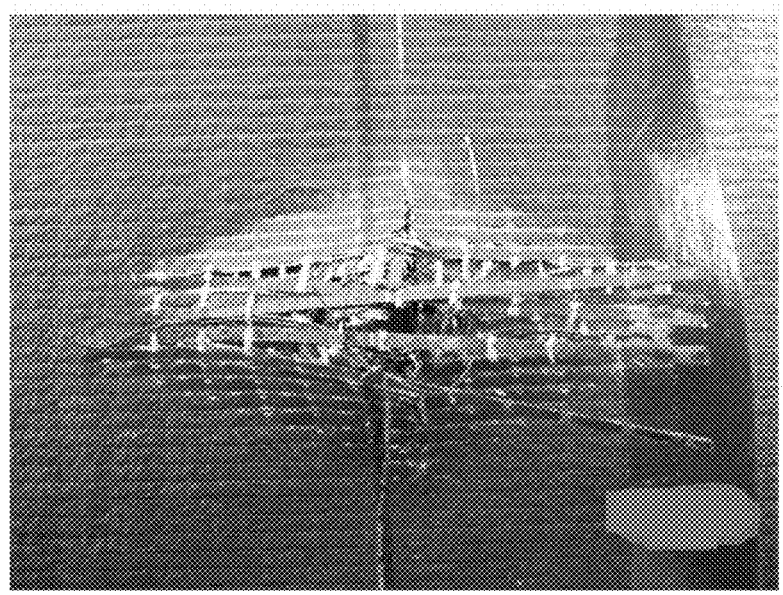

FIGS. 7a and 7b are photographs of the front and back face of the non-woven structures following impact.

Additionally, variations to the disclosed embodiments can be understood and effectuated by the skilled person in practicing some embodiments, from a study of the drawings, the disclosure, and the appended claims. In the claims, the word "including" does not exclude other elements or steps, and the indefinite article "a" or "an" does not exclude a plurality. The mere fact that certain features are recited in mutually different dependent claims does not indicate that a combination of these features cannot be used to advantage.

The foregoing broadly describes certain embodiments of some embodiments without limitation. Variations and modifications as will be readily apparent to those skilled in the art are intended to be within the scope of some embodiments as defined in and by the appended claims.

The invention claimed is:

1. A composite material, comprising:
a preform material including reinforcing fibres and shape memory alloy (SMA) wires, wherein the SMA wires and reinforcing fibres are not woven together;
wherein the preform material does not comprise polymer resin, and the reinforcing fibres and SMA wires are held together by a thread that includes a polymer.

2. The composite material according to claim 1, wherein the SMA alloy wires are selected from Ti—Ni, Ti—Ni—Cu, Ti—Ni—Nb or Ti—Ni—Hf, copper-based SMAs including Cu—Zn—Al, Cu—Al—Ni, Cu—Al—Zn—Mn, Cu—Al—Ni—Mn or Cu—Al—Mn—Ni or iron-based SMAs comprising Fe—Mn—Si, Fe—Cr—Ni—Mn—Si—Co, Fe—Ni—Mn, Fe—Ni—C or Fe—Ni—Co—Ti.

3. The composite material according to claim 2, wherein the SMA alloy wires are Ti—Ni.

4. The composite material according to claim 1, wherein the reinforcing fibres are selected from one or more of carbon fibre, glass, aramid, polyethylene or boron fibres.

5. The composite material according to claim 4, wherein the reinforcing fibres are carbon fibres.

6. The composite material according to claim 1, wherein the composite material consists of a single ply or includes a number of plies and in each of the ply or plies the SMA wires and reinforcing fibres are arranged in a single direction.

7. The composite material according to claim 6, wherein the composite material comprises a number of plies and the single direction in at least 2 plies is different.

8. The composite material according to claim 7, wherein the variance in the single direction is in the range of >0° to < about 180°.

9. The composite material according to claim 1, wherein the wires are in the martensitic twinning form.

10. A prepreg material suitable for forming the composite material in accordance with claim 1, the prepreg material comprising:
reinforcing fibres and SMA wires,
wherein the SMA wires and reinforcing fibres are not woven together and the fibres are coated and/or impregnated with polymer resin which has not been cured.

11. The prepreg material according to claim 10, wherein the prepreg material is a single layer (or single ply).

12. The prepreg material according to claim 10, wherein the material is a single ply material and is in the form of a tape.

13. A tape according to claim 12, wherein the tape has of a width of about 3 mm to less than or equal to about 8 cm.

14. The preform material according to claim 1, wherein the thread consists of, or consists essentially of, the polymer.

15. The preform material according to claim 14, wherein the polymer thread is a polyester thread.

16. The preform material according to claim 1, wherein the preform material is a non crimp fabric preform material.

17. The preform material according to claim 1, wherein the preform material is a single layer (or a single ply).

18. The preform material according to claim 1, wherein the preform material comprises more than one layer including a stack.

19. The preform material according to claim 17, wherein the preform further includes polymer resin.

20. The preform material according to claim 19, wherein the preform is infused with a polymer resin.

21. A method of making the composite material according to claim 1, comprising:
curing a prepreg material reinforcing fibres and SMA wires, wherein the SMA wires and reinforcing fibres are not woven together and the fibres are coated and/or impregnated with polymer resin which has not been cured.

22. The method according to claim 21, wherein the polymer resin is cured using heat and/or UV.

23. The method according to claim 22, wherein the polymer resin is also cured including the application of pressure.

24. The method according to claim 22, wherein the polymer resin further includes a curing agent including an amine.

25. The method according to claim 21, wherein the polymer resin is selected from one or any combination of an epoxy resin, an acrylic resin, a polyester resin, a polyvinyl ester, a polyurethane resin, a phenolic resin, an amino resin or a furan resin.

26. A method of making the composite material in accordance with claim 1, comprising:
forming a first layer of preform, forming at least one further layer of preform,
depositing or layering the at least one further layer of preform on the first layer of preform to form a stacked preform and applying polymer resin to the stacked preform, and
curing the polymer resin to form the composite material, wherein the first layer and at least one further layer of preform are optionally in the form of a non crimp woven or a non crimp fabric.

27. The method according to claim 26 wherein the polymer resin is applied using a resin infusion process or a resin transfer moulding process.

28. The method according to claim 27, wherein the polymer resin is applied using resin transfer molding (RTM).

29. A method of making the composite material in accordance with claim 1, the method comprising:
laying on to a substrate a prepreg material reinforcing fibres and SMA wires using an automatic tape laying process, wherein the SMA wires and reinforcing fibres are not woven together and the fibres are coated and/or impregnated with polymer resin which has not been cured.

30. The method according to claim 29, wherein a tape or the prepreg material is laid using an automatic fibre placement process.

31. The method of making the composite material according to claim 30, wherein in the automatic fibre placement process, at least one fibre and at least one wire are fed into a channel of a head component for use in the automatic fibre placement process, the head component including more than one of the channels.

32. A head component suitable for use in an automatic fibre placement device or apparatus which is suitable for forming the composite material in accordance with claim 1, the head component comprising:
a number of channels which are adapted to receive at least one reinforcing fibre and at least one SMA wire,
wherein the channels are adapted to align the at least one fibre and at least one SMA wire so that the at least one SMA wire is positioned or arranged laterally to the at least one fibre and the fibre and SMA wire are unidirectional.

33. The head component according to claim 32, wherein the fibre is impregnated and/or coated with polymer resin.

34. An article, comprising:
the composite material in accordance with claim 1.

35. The article according to claim 34, wherein the article is coated with the composite material.

36. The article according to claim 34, wherein the article includes a main body and the main body includes the composite material.

37. The article according to claim 34, wherein the article is an aircraft structural component.

38. The article according to claim 37, wherein the aircraft structural component is a nacelle.

39. A method of fabricating or coating the article in accordance with claim 34, the method comprising:
   combining SMA wires,
   reinforcing fibres and polymer resin to form a ply of a material suitable for forming a composite material that includes a polymer matrix material with reinforcing fibres and shape memory alloy (SMA) wires embedded therein, wherein the SMA wires and reinforcing fibres are not woven together,
   curing the ply and laminating more than one of the plies to fabricate or coat the article.

* * * * *